(12) United States Patent
Watanabe

(10) Patent No.: US 7,624,361 B2
(45) Date of Patent: Nov. 24, 2009

(54) METHOD AND DEVICE FOR DESIGNING SEMICONDUCTOR INTEGRATED CIRCUIT

(75) Inventor: Kenichi Watanabe, Tagajo (JP)

(73) Assignee: Freescale Semiconductor, Inc, Austin, TX (US)

( * ) Notice: Subject to any disclaimer, the term of this patent is extended or adjusted under 35 U.S.C. 154(b) by 195 days.

(21) Appl. No.: 11/775,228

(22) Filed: Jul. 10, 2007

(65) Prior Publication Data

US 2008/0010618 A1 Jan. 10, 2008

(30) Foreign Application Priority Data

Jul. 10, 2006 (JP) ............... 2006-189730

(51) Int. Cl.
*G06F 17/50* (2006.01)
(52) U.S. Cl. ............... 716/2; 716/4; 716/12
(58) Field of Classification Search ............ 716/2, 716/4, 12
See application file for complete search history.

(56) References Cited

U.S. PATENT DOCUMENTS

| | | | | |
|---|---|---|---|---|
| 5,673,420 | A * | 9/1997 | Reyes et al. ............... | 716/4 |
| 6,687,883 | B2 * | 2/2004 | Cohn et al. ............... | 716/4 |
| 2002/0144214 | A1 * | 10/2002 | Rao et al. ............... | 716/2 |
| 2003/0212964 | A1 * | 11/2003 | Rao et al. ............... | 716/1 |
| 2005/0097493 | A1 * | 5/2005 | Monthie et al. ............... | 716/11 |
| 2006/0184904 | A1 * | 8/2006 | Murgai et al. ............... | 716/4 |
| 2007/0094623 | A1 * | 4/2007 | Chen et al. ............... | 716/4 |

FOREIGN PATENT DOCUMENTS

JP 2005190237 A 7/2005

* cited by examiner

*Primary Examiner*—Stacy A Whitmore
(74) *Attorney, Agent, or Firm*—Charles Bergere

(57) ABSTRACT

A method and device for designing a semiconductor integrated circuit that easily reduces off leakage current. Wires connected to input terminals of a standard cell are exchanged with one another and a gate net list is changed so as to reduce off leakage current in accordance with a net probability and a current consumption table. The net probability is the probability of the state an input of the standard cell can take and is generated through an RTL function simulation and a gate level function simulation. The current consumption table is stored in a technology library storage.

8 Claims, 5 Drawing Sheets

| WIRE 45 | | NET PROBABILITY (%) | OFF LEAK CURRENT ($\mu$A) ~41 |
|---|---|---|---|
| | 0 | 0 | 25 |
| | | 25 | 20 |
| | | 50 | 15 |
| | | 75 | 10 |
| | | 100 | 5 |
| | 1 | 0 | 5 |
| | | 25 | 10 |
| | | 50 | 15 |
| | | 75 | 20 |
| | | 100 | 25 |

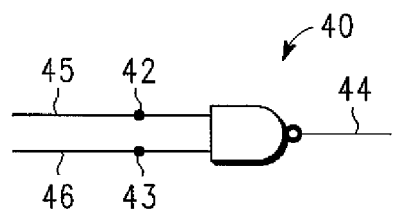
*FIG. 3*
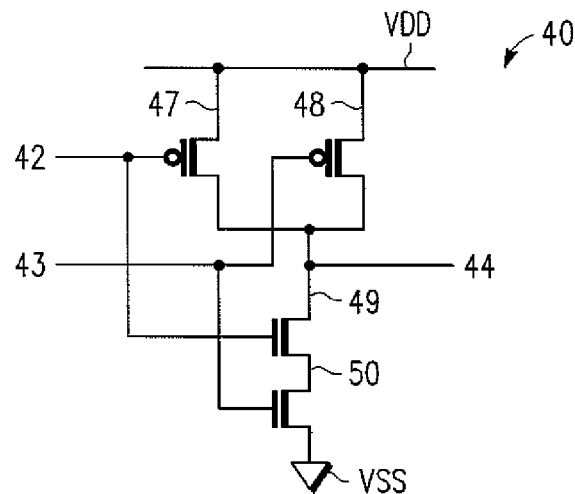
*FIG. 4*
| INPUT TERMINAL | | OUTPUT TERMINAL |
|---|---|---|
| 42 | 43 | 44 |
| 0 | 0 | 1 |
| 0 | 1 | 1 |
| 1 | 0 | 1 |
| 1 | 1 | 0 |
*FIG. 5*

| | | NET PROBABILITY (%) | OFF LEAK CURRENT (µA) | |
|---|---|---|---|---|
| WIRE 45 | 0 | 0 | 25 | 41 |
| | | 25 | 20 | |
| | | 50 | 15 | |
| | | 75 | 10 | |
| | | 100 | 5 | |
| | 1 | 0 | 5 | |
| | | 25 | 10 | |
| | | 50 | 15 | |
| | | 75 | 20 | |
| | | 100 | 25 | |

*FIG. 6*

| | 0 | 1 | |
|---|---|---|---|
| WIRE 45 | 50% | 50% | 51 |
| WIRE 46 | 5% | 95% | |

METHOD AND DEVICE FOR DESIGNING SEMICONDUCTOR INTEGRATED CIRCUIT

BACKGROUND OF THE INVENTION

The present invention relates to a method and device for designing a semiconductor integrated circuit.

Due to the recent increase of mobile devices, a semiconductor integrated circuit is required to have a large scale while consuming less power. However, due to the scale enlargement of the semiconductor integrated circuit, a plurality of functional blocks is located on the semiconductor integrated circuit, and the power consumption of each functional block has increased.

In addition to the current consumed during operation of the semiconductor integrated circuit, the current consumed when the semiconductor integrated circuit stops functioning, especially, the leakage current produced when the power is off has a tendency of increasing. Originally, the off leakage current of a CMOS transistor, which forms a semiconductor integrated circuit, is small and was thus ignored. However, the higher integration of a semiconductor integrated circuit has resulted in the miniaturization of the CMOS transistor and shortened the gate length. Thus, the off leakage current can no longer be ignored. Accordingly, a semiconductor design tester has been proposed to reduce the off leakage current when designing a semiconductor integrated circuit (for example, Japanese Laid-Open Patent Publication No. 2005-190237).

In the semiconductor design tester described in Japanese Laid-Open Patent Publication No. 2005-190237, the power consumption is calculated from signal level/signal information files, which are obtained by simulating internal signals of a semiconductor integrated circuit, and a technology library file. Based on the value of the calculated power consumption, logic synthesis is performed so that one circuit cancels the off leakage current of another circuit. Accordingly, logic synthesis that is effective for reducing the off leakage current has been automatically performed without manually correcting the gate net list.

However, in the semiconductor design tester described in Japanese Laid-Open Patent Publication No. 2005-190237, to reduce the off leakage current, the power consumption of the semiconductor integrated circuit must be calculated and logic synthesis must be performed. Such processing is complicated and burdensome.

SUMMARY OF THE INVENTION

The present invention provides a method and device for designing a semiconductor integrated circuit that reduces the off leakage current.

One aspect of the present invention is a method for designing a semiconductor integrated circuit reducing off leakage current of a standard cell used to form the semiconductor integrated circuit. The standard cell is provided with a library of off leakage current corresponding to the state of an input to each of a plurality of input terminals of the standard cell. The method includes generating a net probability for each input terminal of the standard cell. The net probability is the probability of the state an input to each input terminal can take. The method further includes exchanging wires connected to the input terminals of the standard cell with one another based on the net probability and the library so as to reduce the off leakage current.

A further aspect of the present invention is a device for designing a semiconductor integrated circuit reducing off leakage current of a standard cell used to form the semiconductor integrated circuit. The standard cell is provided with a library of off leakage current corresponding to the state of an input to each of a plurality of input terminals of the standard cell. The device includes a probability generation means for generating a net probability for each input terminal of the standard cell. The net probability is the probability of the state an input to each input terminal can take. An exchanging means exchanges wires connected to the input terminals of the standard cell with one another based on the net probability and the library so as to reduce the off leakage current.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a block diagram of a standard cell in the semiconductor design device of FIG. 1;

FIG. 4 is a circuit diagram of the standard cell;

FIG. 5 is a logic table of the standard cell;

FIG. 6 is a current consumption table used in the preferred embodiment;

FIG. 7 is a table showing the net probability in the preferred embodiment; and

DETAILED DESCRIPTION OF THE PREFERRED EMBODIMENTS

Figure 1:
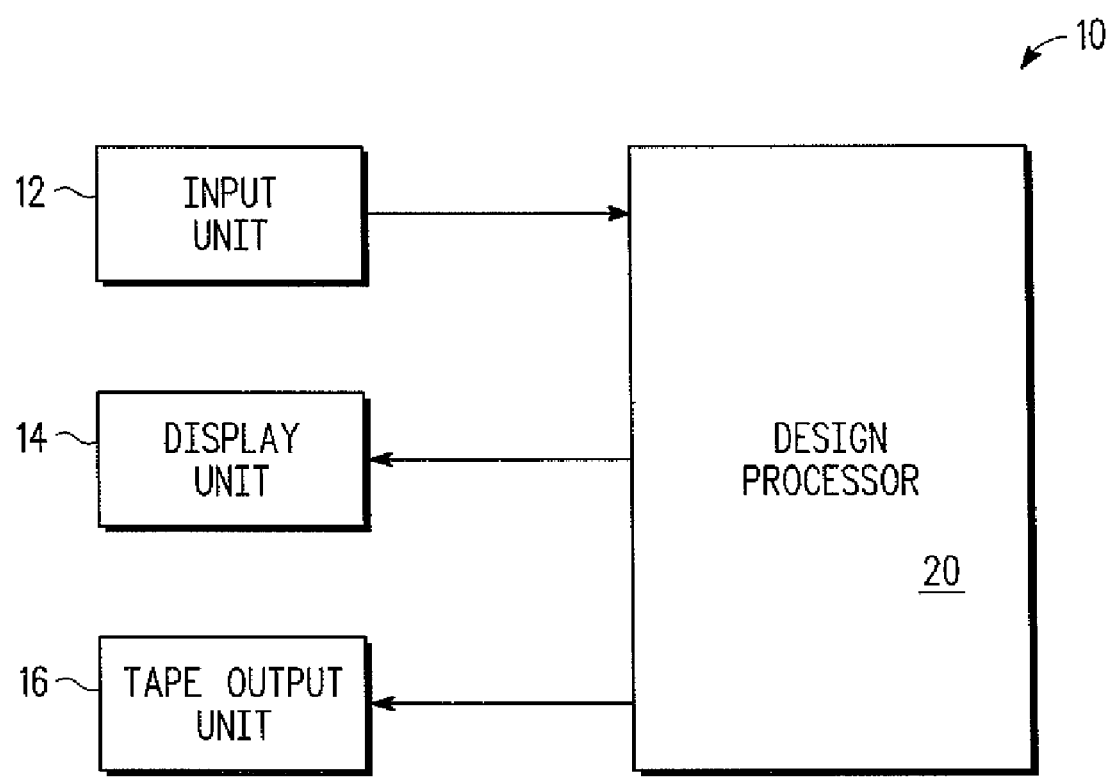
FIG. 1 is a schematic block diagram of a semiconductor design device according to a preferred embodiment of the present invention.

A preferred embodiment of the present invention will now be described with reference to the drawings. FIG. 1 is a schematic block diagram showing the structure of a semiconductor designing device 10, which functions as a device for designing a semiconductor integrated circuit. As shown in FIG. 1, the semiconductor designing device 10 includes a design processor 20, which is connected to an input unit 12, a display unit 14, and a tape output unit 16. An operator operates the input unit 12 to generate an input. The display unit 14 displays operations of the design processor 20 on a screen. Further, data related to a completed circuit design drawing (layout data) is output from the design processor 20 to the tape output unit 16.

Figure 2:
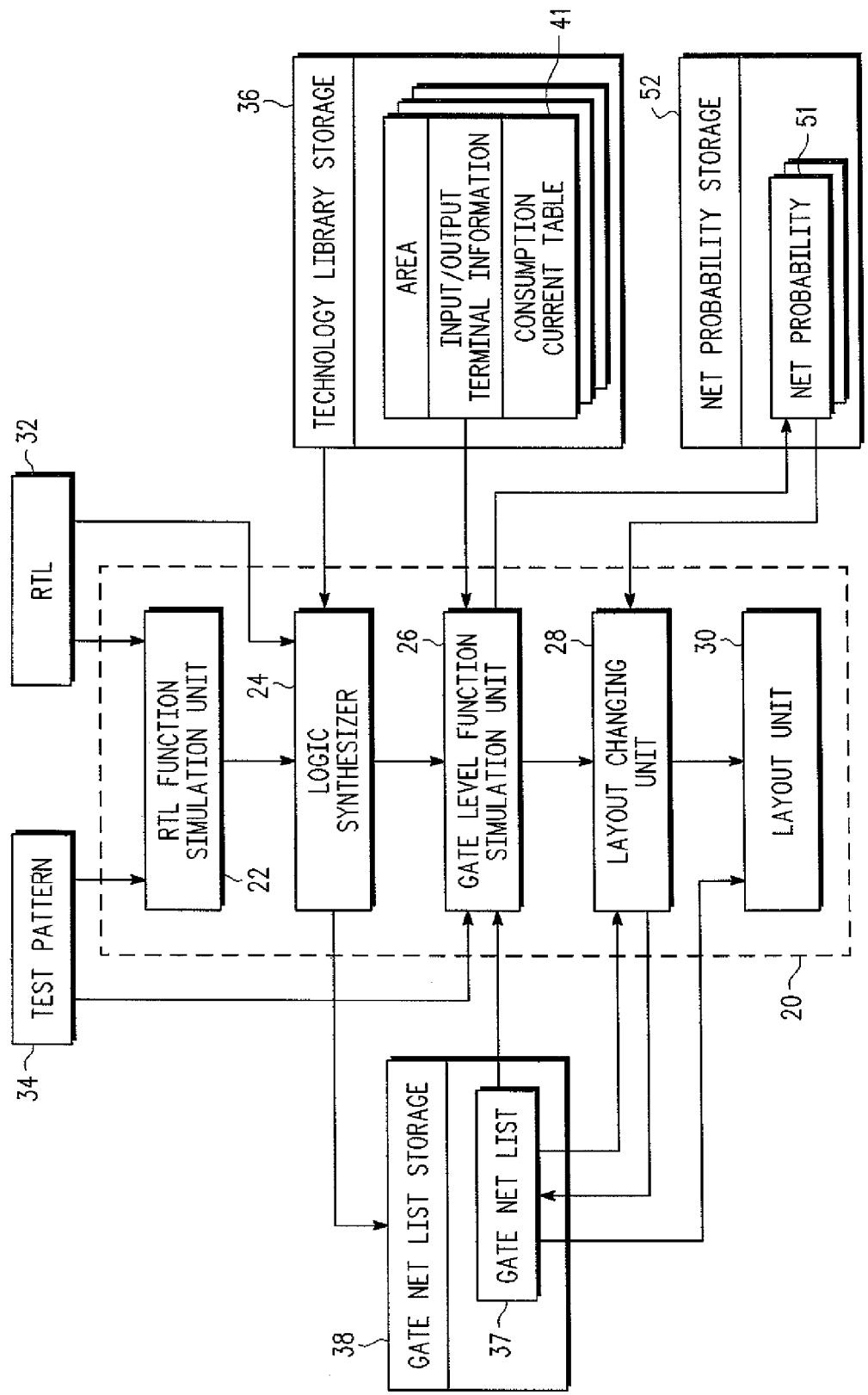
FIG. 2 is a schematic block diagram of a design processor in the semiconductor design device of FIG. 1.

FIG. 2 is a block diagram of the design processor 20. As shown in FIG. 2, the design processor 20 includes an RTL function simulation unit 22, a logic synthesizer 24, a gate level function simulation unit 26 functioning as a probability generation means, a layout changing unit 28 functioning as an exchanging means and a gate net list changing means, and a layout unit 30.

When an RTL 32 and a test pattern 34 are input to the RTL function simulation unit 22, the RTL function simulation unit 22 conducts a simulation to check whether or not the RTL 32 functions as designed. Then, the RTL function simulation unit 22 outputs the simulation result as "OK" or "NG" to the logic synthesizer 24. The RTL 32 is hardware description language (HDL) and describes a circuit specification. Further, the test pattern 34 is an input pattern for conducting function testing.

When the result of the RTL function simulation unit 22 is "OK," the logic synthesizer 24 performs logic synthesis with the RTL 32 and a technology library storage 36, which functions as a library, to generate a gate net list 37. The logic synthesizer 24 then stores the gate net list 37 in a gate net list storage 38. The technology library storage 36 is a storing means for storing information related to a standard cell 40, which forms a semiconductor integrated circuit and which is a circuit having a certain function, such as a NAND or a NOR. Information related to the standard cell 40 includes input/output terminal information, area, and a current consumption table 41 for the standard cell 40 that is in accordance with the probability that may be taken by a signal received by an input terminal.

FIG. 3 is a block diagram showing an example of the standard cell 40, and FIG. 4 is a circuit diagram of the standard cell 40. The standard cell 40 is a two-input NAND and has a first input terminal 42, a second input terminal 43, and an output terminal 44, as shown in FIGS. 3 and 4. A wire is connected to each of the input and output terminals. For example, a wire 45 is connected to the first input terminal 42, and a wire 46 is connected to the second input terminal 43.

As shown in FIG. 4, the standard cell 40 includes a first transistor 47, a second transistor 48, a third transistor 49, and a fourth transistor 50. The sources of the first transistor 47 and the second transistor 48 are connected to a power supply VDD. The first input terminal 42 is connected to the gates of the first transistor 47 and the third transistor 49. The second input terminal 43 is connected to the gates of the second transistor 48 and the fourth transistor 50. The drains of the first transistor 47 and the second transistor 48 are connected to the output terminal 44. The third transistor 49 has a drain connected to the output terminal 44 and a source connected to the fourth transistor 50. The source of the fourth transistor 50 is connected to VSS.

When the first input terminal 42 and the second input terminal 43 are provided with an input signal, the output terminal 44 of the standard cell 40 generates an output as shown in FIG. 5. In this state, the first input terminal 42 and the second input terminal 43 are logically equivalent to the output terminal 44. Thus, even if the signal that is to be input to the first input terminal 42 is input to the second input terminal 43 and the signal that is to be input to the second input terminal 43 is input to the first input terminal 42, the output from the output terminal 44 is the same.

The current consumption table 41 is a table for the standard cell 40 and lists the off leakage current for each net probability 51. Further, the current consumption table 41 is stored in the technology library storage 36 for each wire connected to each input terminal of the standard cell 40. FIG. 6 shows the current consumption table 41 indicating the off leakage current corresponding to the net probability 51 for each signal (input state) input to, for example, the wire 45, which is connected to the first input terminal 42.

The net probability 51 is the probability of each net taking the signal of either "0" or "1" during a predetermined period. The sum of each net probability 51 for the wire connected to each input terminal would be 100%. The net probability 51 is calculated from the gate level function simulation result. For example, if the gate level function simulation result for the output terminal 44 is "1" for fifty times and "0" for fifty times, the net probability 51 for the output terminal 44 would be 50% for "1" and 50% for "0." FIG. 7 is a table for one example of the net probability 51 and shows the probability of the wire 45, which is connected to the first input terminal 42, and the wire 46, which is connected to the second input terminal 43, taking the signal of "0" or "1." For the wire 45 connected to the first input terminal 42, the net probability 51 is 50% for both of "1" and "0" even if the wire 45 fluctuates fifty times at a predetermined frequency during a predetermined time. The net probability 51 is also 50% for both of "1" and "0" when the wire 45 is "0" during the first half of the predetermined time and "1" during the second half of the predetermined time.

Referring to FIG. 2, the gate net list storage 38 is a data storing means for storing the gate net list 37, which is data related to the function and structure of the semiconductor integrated circuit described by the RTL 32. Further, the gate net list storage 38 includes input and output terminals of a semiconductor integrated circuit, a plurality of standard cells 40, and wires connecting the standard cells 40.

When provided with the test pattern 34, information related to the standard cells 40 from the technology library storage 36, and the gate net list 37, the gate level function simulation unit 26 outputs and stores the net probability 51 together with the gate level function simulation result in a net probability storage 52. The gate net list 37 and the net probability 51 are input to the layout changing unit 28. Then, the layout changing unit 28 exchanges the wires connected to input terminals through a process that will be described later and generates a new gate net list 37. The layout changing unit 28 uses a gate net list 37 describing the standard cell 40 of which wires connected to input terminal have been exchanged as the new gate net list 37. The layout changing unit 28 stores the new gate net list 37 in the gate net list storage 38. The new gate net list 37 is input to the layout unit 30. The layout unit 30 inputs the new gate net list 37, determines the layout of wires between the input terminals and the standard cells 40, and outputs layout data to the tape output unit 16.

Figure 8:
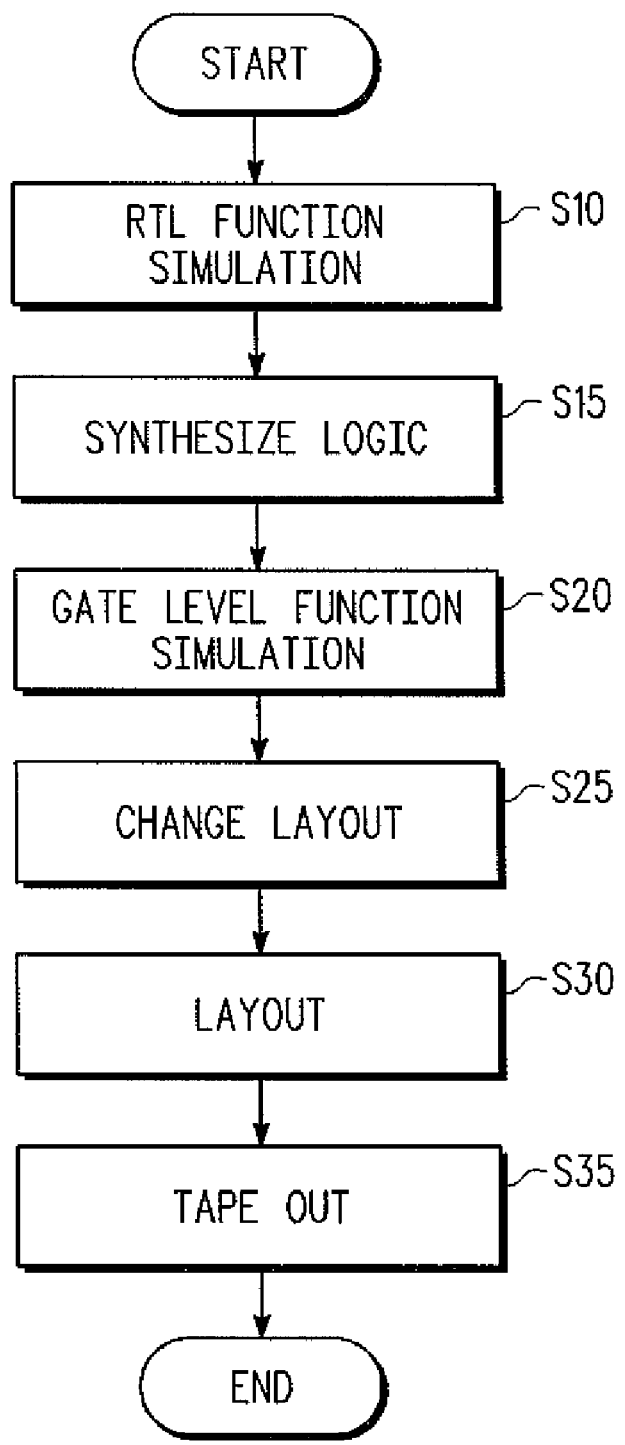
FIG. 8 is a flowchart showing the procedures for designing the semiconductor integrated circuit of the preferred embodiment.

The process for designing a semiconductor integrated circuit with the semiconductor designing device 10 will now be discussed with reference to FIG. 8.

First, the RTL function simulation unit 22 conducts an RTL function simulation (step S10). More specifically, when receiving the RTL 32 and the test pattern 34, the RTL function simulation unit 22 uses the test pattern 34 to conduct a simulation for checking whether or not the expected function can be obtained with the description of the RTL 32.

When the RTL function simulation unit 22 determines that the description of the RTL 32 obtains the expected function, the logic synthesizer 24 uses the RTL 32 and the technology library storage 36 to perform logic synthesis (step S15). More specifically, the logic synthesizer 24 reads the standard cells 40 described in the RTL 32 from a technology file in the technology library storage 36 to generate the gate net list 37. Then, the logic synthesizer 24 stores the gate net list 37 in the gate net list storage 38.

Next, the gate level function simulation unit 26 conducts a gate level function simulation (step S20: probability generation step). More specifically, the gate level function simulation unit 26 receives the test pattern 34, the technology library storage 36 (including the current consumption table 41), and the gate net list 37. Further, the gate level function simulation unit 26 conducts a simulation and outputs the net probability 51. In this state, it is assumed that the wire 45 is connected to the first input terminal 42 and the wire 46 is connected to the second input terminal 43.

Subsequently, the layout changing unit 28 changes the layout (step S25: exchanging step and gate net list changing step). More specifically, the layout changing unit 28 inputs the gate net list 37 and the net probability 51, exchanges the wires connected to the input terminals of the standard cells 40 so that the off leakage current becomes minimum, and stores the resulting gate net list 37 as the new gate net list 37 in the net list storage 38.

For example, referring to FIG. 3, the wire 46 is connected to the first input terminal 42, which was supposed to be connected to the wire 45, and the wire 45 is connected to the second input terminal 43, which was supposed to be connected to the wire 46. If the value of the off leakage current is the same before and after exchanging the wires, the wires connected to input terminals are not exchanged.

When the layout change is completed, the layout unit 30 determines the layout (step S30). More specifically, the layout unit 30 determines the layout using the new gate net list 37 stored in the gate net list storage 38. Then, the design processor 20 uses the tape output unit 16 to perform tape out with the generate layout data (step S35). This generates mask data used to manufacture the semiconductor integrated circuit.

The preferred embodiment has the advantages described below.

(1) In the preferred embodiment, off leakage current of the standard cell 40 is reduced just by referring to the net probability 51 and the current consumption table 41 and exchanging input terminals.

(2) In the preferred embodiment, the net probability 51 is generated by the gate level function simulation of the gate level function simulation unit 26. As a result, the net probability 51 is generated in one of the steps for designing a semiconductor integrated circuit by combining standard cells 40. Accordingly, the net probability is generated without the need for a new step.

(3) In the preferred embodiment, the input terminals of the standard cells 40 are automatically exchanged by referring to the net probability 51 and the current consumption table 41. Accordingly, off leakage current is automatically reduced. Thus, off leakage current is readily and easily reduced.

(4) In the preferred embodiment, just by referring to the net probability 51 and the current consumption table 41, the determination of whether or not to exchange input terminals can be carried out. Further, off leakage current can be reduced. Accordingly, there is no complicated processing. Thus, off leakage current can be reduced within a short period of time.

It should be apparent to those skilled in the art that the present invention may be embodied in many other specific forms without departing from the spirit or scope of the invention. Particularly, it should be understood that the present invention may be embodied in the following forms.

In the preferred embodiment, the two-input NAND circuit is used as an example of the standard cell 40. However, the present invention is not limited in such a manner, and the standard cell 40 may be any logic circuit, such as a NOR circuit, or a logic circuit having two or more input terminals.

In the preferred embodiment, the wires connected to the input terminals are automatically exchanged based on the gate net list 37 prior to the determination of the layout. However, without changing the gate net list 37, the layout unit may exchange the wires connected to the input terminals after the layout is determined. In this case, the layout unit functions as an exchanging means.

In the preferred embodiment, the net probability 51 is generated by the gate level function simulation. However, the net probability generated by the RTL function simulation may be propagated on a gate net list to generate a net probability that is input to the layout changing unit.

The present examples and embodiments are to be considered as illustrative and not restrictive, and the invention is not to be limited to the details given herein, but may be modified within the scope and equivalence of the appended claims.

What is claimed is:

1. A computer readable medium including a computer program, wherein the computer program performs a method for designing a semiconductor integrated circuit reducing off leakage current of a standard cell used to form the semiconductor integrated circuit, the standard cell provided with a library of off leakage current corresponding to a state of an input to each of a plurality of input terminals of the standard cell, the method comprising the steps of:

generating a net probability for each input terminal of the standard cell, wherein the net probability is the probability of the state an input to each input terminal can take; and exchanging wires connected to the input terminals of the standard cell with one another based on the net probability and the library so as to reduce the off leakage current.

2. The computer readable medium according to claim 1, wherein the net probability is generated through one of an RTL function simulation or a gate level function simulation.

3. The computer readable medium according to claim 1, wherein:

the library includes a current consumption table corresponding to the net probability; and the step of exchanging wires includes exchanging wires connected to the input terminals of the standard cell with one another in accordance with the net probability and the current consumption table so as to most reduce the off leakage current.

4. The computer readable medium according to claim 1, further comprising the step of:

changing a gate net list of the standard cell when exchanging wires connected to the input terminals of the standard cell with one another.

5. A device for designing a semiconductor integrated circuit reducing off leakage current of a standard cell forming the semiconductor integrated circuit, the standard cell provided with a library of off leakage current corresponding to the state of an input to each of a plurality of input terminals of the standard cell, the device comprising:

a probability generation means for generating a net probability for each input terminal of the standard cell, wherein the net probability is the probability of the state an input to each input terminal can take; and an exchanging means for exchanging wires connected to the input terminals of the standard cell with one another based on the net probability and the library so as to reduce the off leakage current.

6. The device according to claim 5, wherein the net probability is generated through an RTL function simulation or a gate level function simulation.

7. The device according to claim 5, wherein:

the library includes a current consumption table corresponding to the net probability; and the exchanging means exchanges wires connected to the input terminals of the standard cell with one another in accordance with the net probability and the current consumption table so as to most reduce the off leakage current.

8. The device according to claim 5, further comprising:

a gate net list changing means for changing the gate net list when exchanging wires connected to the input terminals of the standard cell with one another.

* * * * *